United States Patent [19]
Yokoyama

[11] Patent Number: 6,132,106
[45] Date of Patent: Oct. 17, 2000

[54] OPTICAL COUPLING MODULE

[75] Inventor: Jun Yokoyama, Tokyo, Japan

[73] Assignee: NEC Corporation, Tokyo, Japan

[21] Appl. No.: 09/195,696

[22] Filed: Nov. 19, 1998

[30] Foreign Application Priority Data

Nov. 25, 1997 [JP] Japan .................................. 9-323262

[51] Int. Cl.[7] ................................................ G02B 6/36
[52] U.S. Cl. ................................ 385/74; 385/33; 385/65
[58] Field of Search ............................. 385/33, 34, 35, 385/65, 74

[56] References Cited

U.S. PATENT DOCUMENTS

| | | | |
|---|---|---|---|
| 5,499,309 | 3/1996 | Kozuka et al. | 385/65 |
| 5,911,021 | 6/1999 | MacDonald et al. | 385/35 |

FOREIGN PATENT DOCUMENTS

| | | |
|---|---|---|
| 62-70806 | 4/1987 | Japan . |
| 2-110425 | 4/1990 | Japan . |
| 9-237930 | 9/1997 | Japan . |

*Primary Examiner*—Hung N. Ngo
*Attorney, Agent, or Firm*—McGinn & Gibb, P.C.

[57] ABSTRACT

An optical coupling module includes first, second, and third substrates, first and second optical fibers, and first and second lenses. The first substrate has a surface formed with a first V-groove. The second substrate has a surface formed with a second V-groove. The third substrate is arranged between the first and second substrates and has a surface formed with first and second recess. The first to third substrates have the surfaces flush with each other. The first and second optical fibers are fixed in the first and second grooves, respectively, and are arranged such that their end faces oppose each other. The first and second lenses are fixed in the first and second recesses, respectively, and are arranged on one optical axis of the first and second optical fibers to be spaced apart from each other by a predetermined distance.

10 Claims, 5 Drawing Sheets

OPTICAL COUPLING MODULE

BACKGROUND OF THE INVENTION

The present invention relates to an optical coupling module for transmitting/receiving an optical signal between optical fibers.

A conventional optical coupling module optically connects optical fibers to each other through lenses. In such an optical coupling module, assume that the optical axis is defined as the Z-axis, that an axis perpendicularly intersecting the optical axis is defined as the X-axis, and that an axis perpendicularly intersecting the optical axis and X-axis is defined as the Y-axis. Lens adjustment is performed in the X- and Y-axis directions perpendicular to the optical axis, and optical fiber adjustment is performed in the direction of optical axis (Z-axis direction) and the X- and Y-axis directions. For example, "Compact and All Resin-Free Polarization-Independent Optical Isolator", PROCEEDINGS OF THE 1993 IEICE AUTUMN CONFERENCE, pp. 4–296, 1993, C-216 describes an optical isolator using such an optical coupling module.

FIG. 5 shows a conventional optical coupling module. In the conventional optical coupling module, a ferrule 410 is mounted on one end portion of an optical fiber 401, as shown in FIG. 5. The ferrule 410 is mounted on one end of a cylindrical metal lens support 406 through a fiber support 408. A lens 403 is fixed in the lens support 406. An end face of the lens support 406 on a side opposite to the optical fiber 401 is connected to one end face of a cylindrical main body 405.

A ferrule 411 is mounted on one end portion of an optical fiber 402. The ferrule 411 is mounted on one end of a cylindrical metal lens support 407 through a fiber support 409. A lens 404 is fixed in the lens support 407. An end face of the lens support 407 on a side opposite to the optical fiber 402 is connected to an end face of the cylindrical main body 405 on a side opposite to the lens support 406.

A method of manufacturing the conventional optical coupling module having the above arrangement will be described. In this description, assume that the optical axis of the end portion of the optical fiber 401 on the ferrule 410 side and the optical axis of the end portion of the optical fiber 402 on the ferrule 411 side are defined as Z-axis, that an axis perpendicularly intersecting the Z-axis is defined as the X-axis, and that an axis perpendicularly intersecting the Z- and X-axes is defined as the Y-axis.

In order to mount the lens support 406, having the lens 403 fixed therein, on the main body 405, the lens support 406 is adjusted in the X- and Y-axis directions with respect to the main body 405. Thereafter, the lens support 406 is fixed to the main body 405 with a YAG (Yttrium Aluminum Garnet) laser or the like.

The ferrule 410 mounted on the optical fiber 401 is adjusted in the X-, Y-, and Z-axis directions, and is mounted on the lens support 406 through the fiber support 408. The lens support 407 and ferrule 411 are mounted on the main body 405 in a similar manner.

Since the conventional optical coupling module has a large number of components, it has many portions that need adjustment, and it takes a long period of time to adjust the optical coupling module. For automatic adjustment of the optical coupling module, since the number of portions that need adjustment is large, the algorithm becomes complicated, and it is difficult to automate adjustment.

In the conventional optical coupling module, the lenses 403 and 404 and the optical fibers 401 and 402 are held/fixed in a plurality of cylindrical members. Accordingly, the number of components is large, and downsizing is difficult to perform.

SUMMARY OF THE INVENTION

It is an object of the present invention to provide an optical coupling module which can be adjusted easily and adjustment of which can be automated easily.

It is another object of the present invention to provide an optical coupling module that can be made compact.

In order to achieve the above objects, according to the present invention, there is provided an optical coupling module comprising a first substrate having a surface formed with a first groove, a second substrate having a surface formed with a second groove, a third substrate arranged between the first and second substrates and having a surface formed with first and second recesses, the first to third substrates having the surfaces flush with each other, first and second optical fibers fixed in the first and second grooves, respectively, and arranged such that end faces thereof oppose each other, and first and second lenses fixed in the first and second recesses, respectively, and arranged on one optical axis of the first and second optical fibers to be spaced apart from each other by a predetermined distance.

DESCRIPTION OF THE PREFERRED EMBODIMENTS

The present invention will be described in detail with reference to the accompanying drawings.

(First Embodiment)

Figure 1:
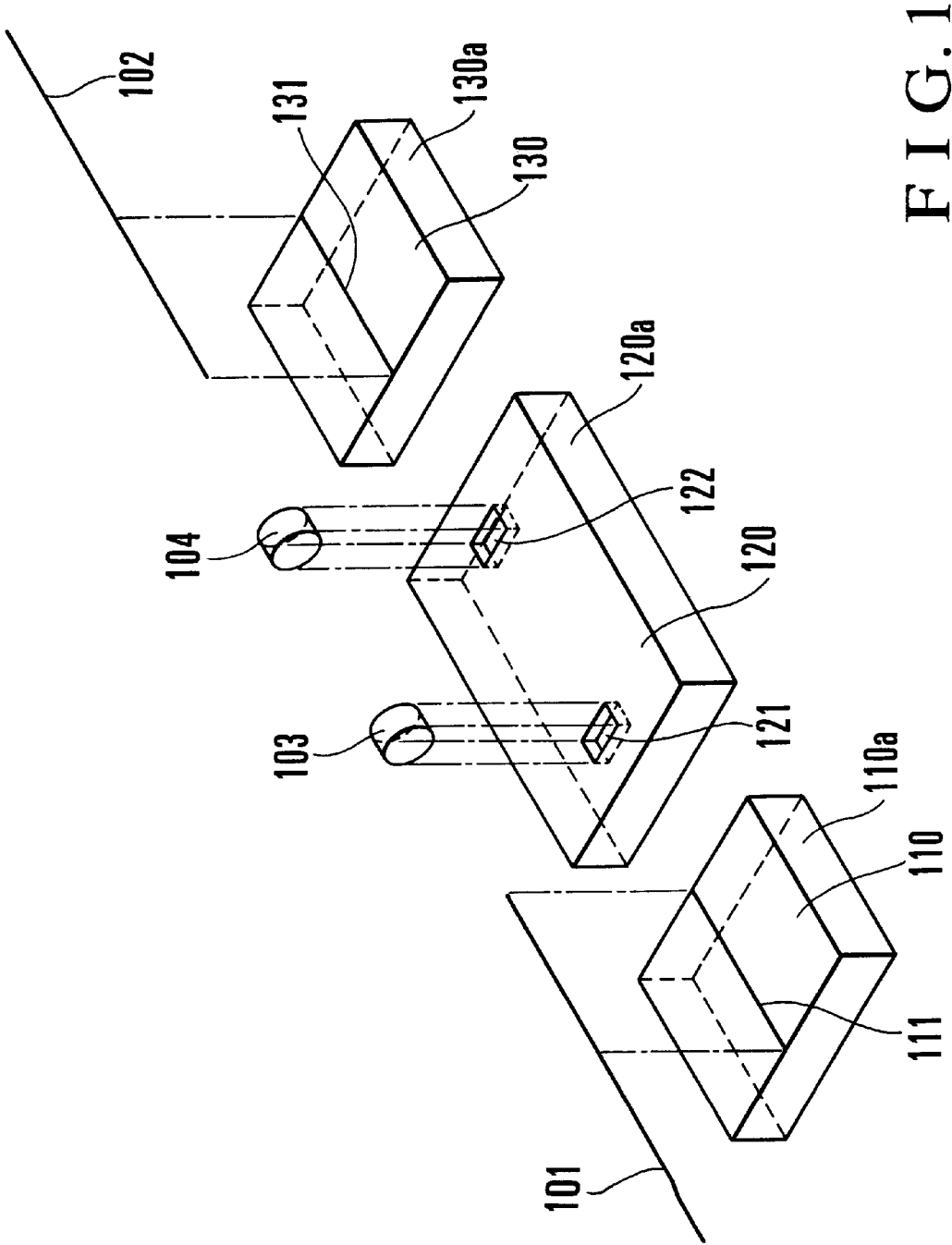
FIG. 1 is an exploded perspective view of an optical coupling module according to the first embodiment of the present invention.

FIG. 1 shows an optical coupling module according to the first embodiment of the present invention. In the optical coupling module of this embodiment, as shown in FIG. 1, a first substrate 110 is arranged to correspond to the end portion of an optical fiber 101, and a second substrate 130 corresponding to the end portion of an optical fiber 102 is arranged to oppose the substrate 110. A third substrate 120 is arranged between the first and second substrates 110 and 130.

V-grooves 111 and 131 extending in the direction along which the substrates 110, 120, and 130 are arranged are formed at the centers of the surfaces of the substrates 110 and 130, respectively. The end portions of the optical fibers 101 and 102 are fixed in the V-grooves 111 and 131, respectively, so that their end faces opposes the end portions of the substrates 110 and 130. More specifically, the end portions of the optical fibers 101 and 102 are positioned by the V-grooves 111 and 131 such that their optical axes coincide with each other, and are mounted on the substrates 110 and 130, respectively.

Between the optical fibers 101 and 102, recesses 121 and 122 are formed in the surface of the substrate 120 in the direction along which the substrates 110, 120, and 130 are arranged, to be spaced from each other by a predetermined distance. Lenses 103 and 104 are fixed in the recesses 121 and 122, respectively.

In this manner, when the optical fibers 101 and 102 are fixed on the surfaces of the substrates 110 and 130, respectively, the optical fibers 101 and 102 are arranged such that their end faces oppose each other. The lenses 103 and 104 are sequentially arranged, between the opposing two end faces of the optical fibers 101 and 102, on the optical axis of the optical fibers 101 and 102.

To form the V-grooves 111 and 131, for example, silicon substrates to be used as the substrates 110 and 130 may be subjected to anisotropic etching, or optical glass or ceramic substrates are cut directly. Alternatively, optical glass substrates to be used as the substrates 110 and 130 are formed by molding. During molding, the V-grooves 111 and 131 are formed in the surfaces of the substrates 110 and 130. With any of these methods, the V-grooves 111 and 131 can be formed with a precision equal to or higher than 1 $\mu$m.

To form the recesses 121 and 122 in the surface of the substrate 120, an optical glass substrate to be used as the substrate 120 is formed by molding. During molding, the recesses 121 and 122 are formed. With this method, the recesses 121 and 122 can be formed with a precision equal to or higher than several $\mu$m.

The substrates 110, 120, and 130 have the same thickness and lengths in the direction of optical axis of the identical optical fibers 101 and 102. Accordingly, the substrates 110, 120, and 130 are arranged in a row such that their lower surfaces are flush with each other and their side surfaces 110a, 120a, and 130a are flush with each other. The side surfaces 110a and 130a of the substrates 110 and 130 are side surfaces on the side parallel to the V-grooves 111 and 131, and the side surface 120a of the substrate 120 is a side surface located on the same side as the side surfaces 110a and 130a.

The V-grooves 111 and 131, and the recesses 121 and 122 are formed such that the end portion of the optical fiber 101, the optical lenses 103 and 104, and the central axis (optical axis) at the end portion of the optical fiber 102 are aligned on one straight line. Therefore, the shift amount of the optical fibers 101 and 102 and lenses 103 and 104 in a direction perpendicular to the optical axis can be suppressed within the error range of the mechanical precision of these constituent components and substrates.

In this embodiment, the recesses 121 and 122 are formed at positions remote from the side surface of the substrate 120, on the substrates 110 and 120 side, by 2.5 mm. The opposing side surfaces of the substrates 110 and 120 are brought into tight contact with each other and the opposing side surfaces of the substrates 120 and 130 are brought into tight contact with each other. Hence, the shift amount between the end face of the optical fiber 101 and the lens 103, and between the end face of the optical fiber 102 and the lens 104, from the designed value can be suppressed within the error range of the mechanical precision of the constituent components.

If the distance between the optical fiber 101 and lens 103, between the optical fiber 102 and lens 104 (the optical fibers 101 and 102 are adjacent to each other), and between the two lenses 103 and 104, and the shift amount between the lenses 103 and 104 in a direction perpendicular to the optical axis fall within the error range of the mechanical precision of the respective constituent elements, an excess loss can be sufficiently suppressed. Regarding, however, the shift amounts between the end portion (end face) of the optical fiber 101 and the lens 103 and between the end portion (end face) of the optical fiber 102 and the lens 104 in a direction perpendicular to the optical axis, the excess loss cannot be suppressed within the error range of the mechanical precision of the constituent components.

Therefore, shifts between the end portion of the optical fiber 101 and the lens 103 and between the end portion of the optical fiber 102 and the lens 104 in the direction perpendicular to the optical axis are corrected by adjusting the positions of the substrates 110, 120, and 130 in the direction perpendicular to the optical axis. This can suppress an excess loss that cannot be suppressed within the error range of the mechanical precision of the constituent components.

As the optical fibers 101 and 102, single-mode fibers each having a diameter of 125 $\mu$m and a mode field diameter of 10 $\mu$m are used. As the lenses 103 and 104, collimator coupling aspherical lenses each having a focal length of 2.5 mm and a diameter of 2 mm are used.

The operation of the optical coupling module shown in FIG. 1 will be described.

Light emerging from the end face of the optical fiber 101 is transmitted through the lens 103 to be converted into a parallel beam having a spot diameter of 500 $\mu$m. This parallel beam is focused by the lens 104 and guided to the end face of the optical fiber 102.

As described above, in the optical coupling module of this embodiment, the optical fibers 101 and 102 and the lenses 103 and 104 are fixed in the V-grooves 111 and 131 and the recesses 121 and 122, respectively, that are formed at the predetermined positions of the plurality of substrates 110, 120, and 130, and the substrates 110, 120, and 130 are arranged to come into tight contact with each other, thereby positioning the optical fibers 101 and 102 and lenses 103 and 104. Optical axis adjustment is performed by adjusting the positions of the substrates 110, 120, and 130 in the direction perpendicular to the optical axis, so that the coupling loss of the optical coupling module can be decreased.

Therefore, when compared to the conventional optical coupling module, adjustment becomes simple and is automated easily. Unlike in the conventional optical coupling module, metal cylinders in which optical fibers and lenses are fixed are not used, making the optical coupling module compact.

(Second Embodiment)

Figure 2:
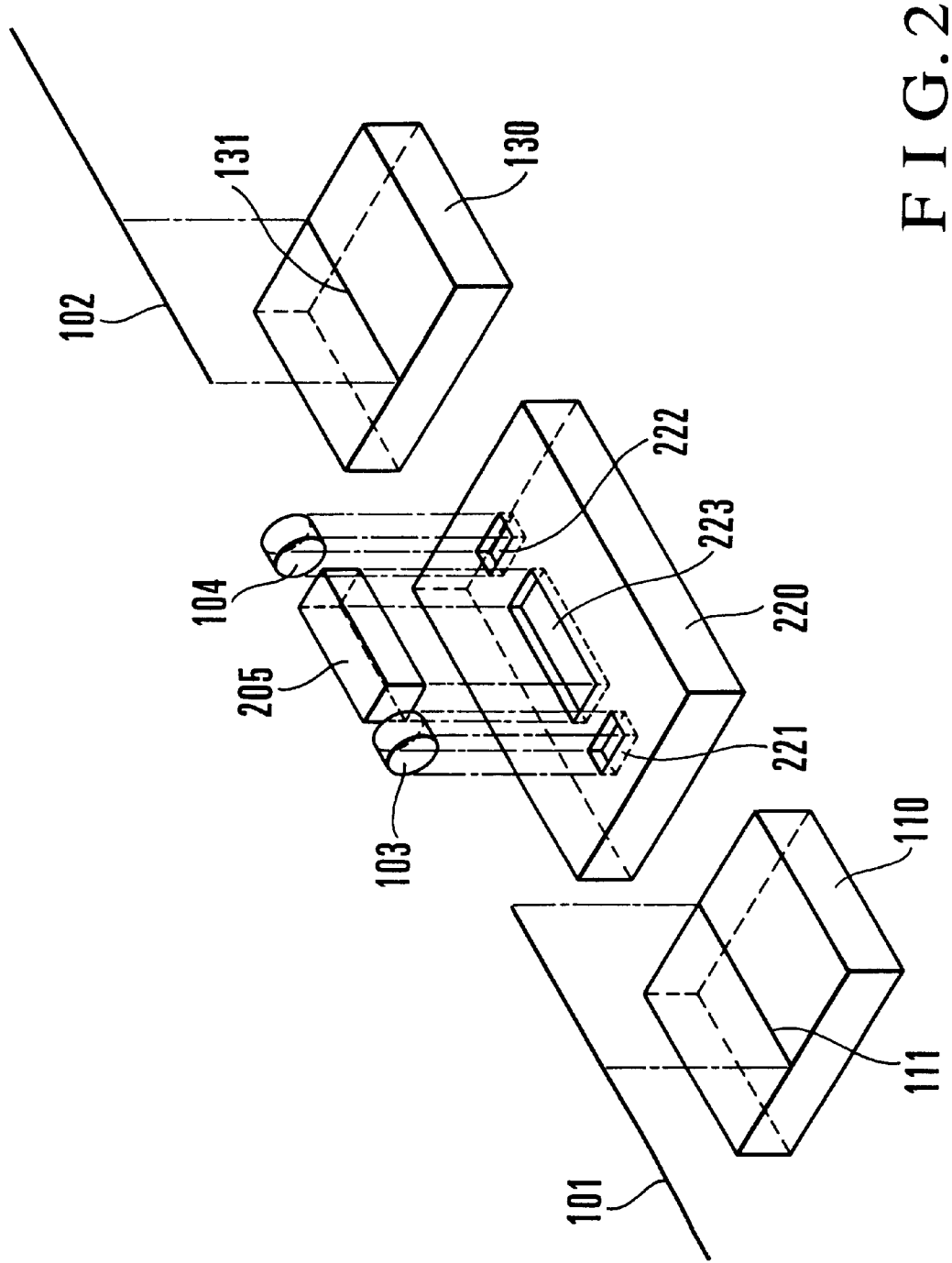
FIG. 2 is an exploded perspective view of an optical coupling module according to the second embodiment of the present invention.

FIG. 2 shows an optical coupling module according to the second embodiment of the present invention.

The optical coupling module of this embodiment is largely different from that of the first embodiment in that an optical element is arranged between two lenses 103 and 104. In FIG. 2, constituent components that are identical to those of the first embodiment are denoted by the same reference numerals as in the first embodiment. The following description will be made mainly on the differences from the first embodiment.

In the optical coupling module of this embodiment, as shown in FIG. 2, a substrate 220 serving as the third substrate is arranged in place of the substrate 120 shown in FIG. 1. A substrate 110, the substrate 220, and a substrate 130 are arranged to have the surfaces flush with each other.

Recesses 221 and 222 are formed in the surface of the substrate 220 in place of the recesses 121 and 122 shown in FIG. 1. An elongated groove-like recess 223 is formed between the recesses 221 and 222. A lens 103 is fixed in the recess 221, and a lens 104 is fixed in the recess 222. A quadrangular prism-shaped optical isolator 205 serving as the optical element is fixed in the recess 223.

In the optical coupling module of this embodiment, the optical isolator 205 is arranged between the lenses 103 and 104, thereby adding the function of an optical isolator to the optical coupling module.

Figure 3:
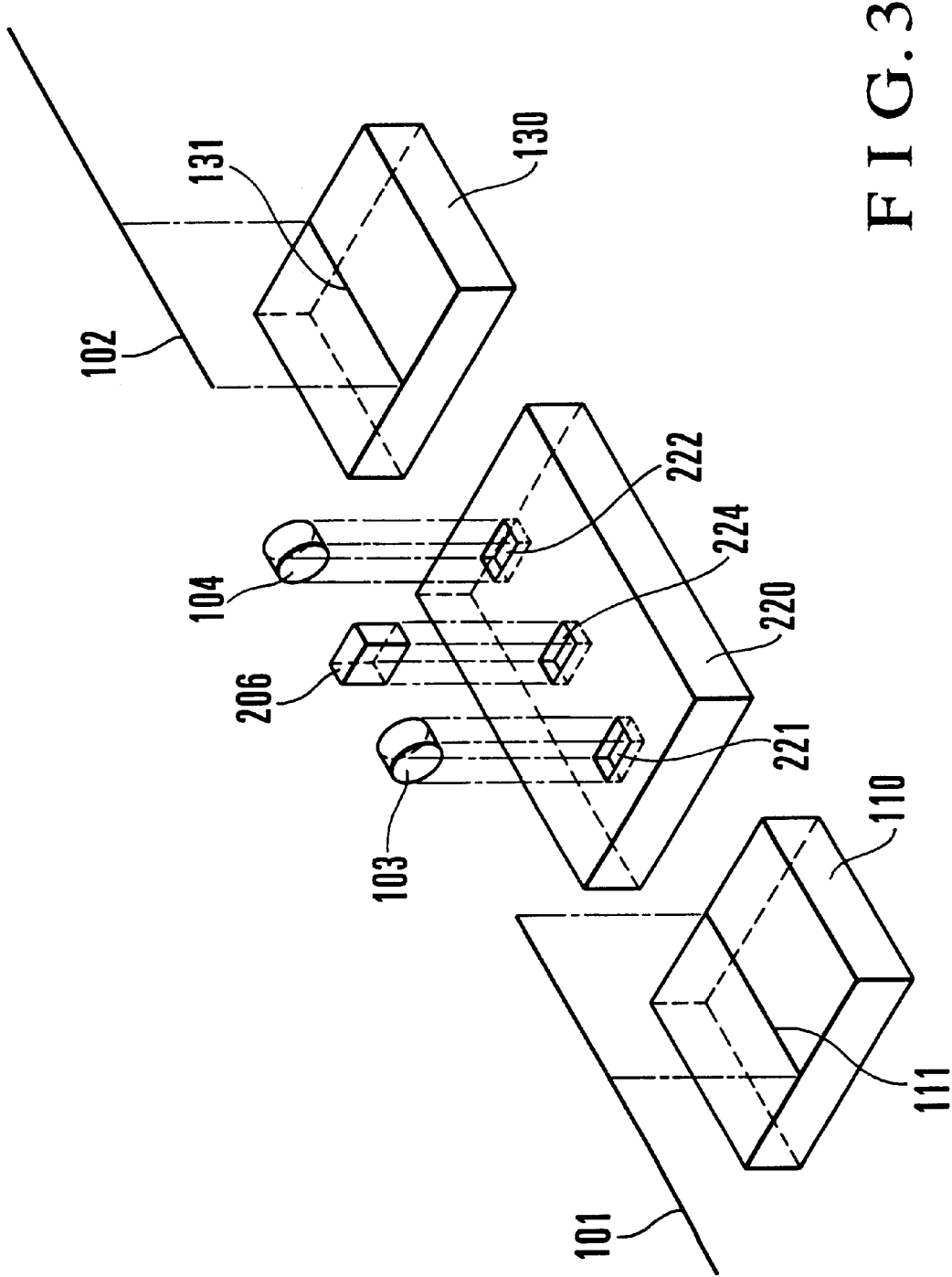
FIG. 3 is an exploded perspective view showing a modification of the optical coupling module shown in FIG. 2.

FIG. 3 shows a modification of the optical coupling module shown in FIG. 2. In the optical coupling module shown in FIG. 3, an optical filter is arranged between lenses 103 and 104 in place of an optical isolator.

As shown in FIG. 3, a recess 224 having a smaller length in the direction of optical axis is formed, in place of a recess 223, between recesses 221 and 222 in the surface of a substrate 220. An optical filter 206 serving as an optical element is fixed in the recess 224. The optical filter 206 is fabricated by depositing an optical film on a glass plate. Thus, the function of an optical filter is added to the optical coupling module shown in FIG. 3.

(Third Embodiment)

Figure 4:
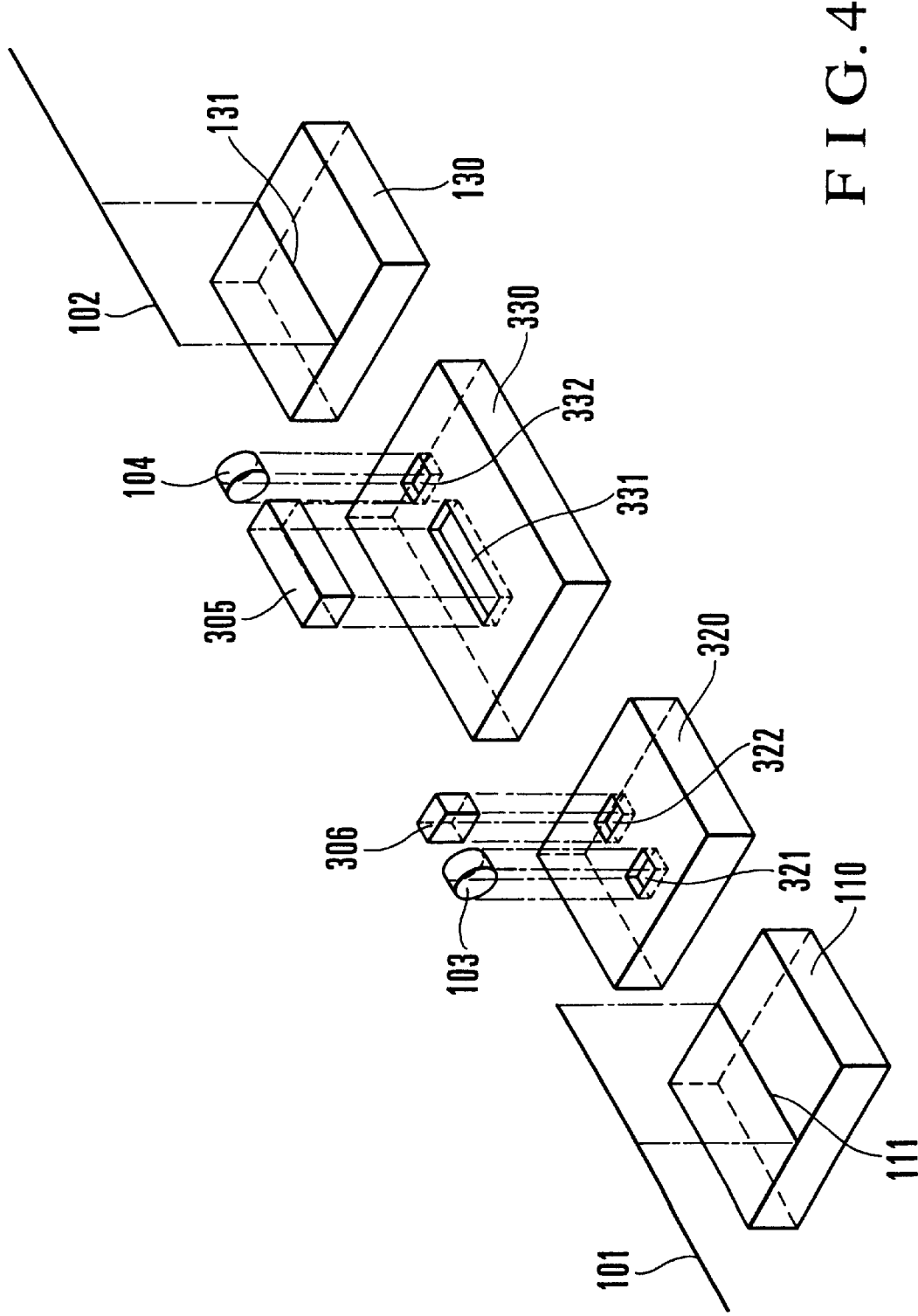
FIG. 4 is an exploded perspective view of an optical coupling module according to the third embodiment of the present invention.
Figure 5:
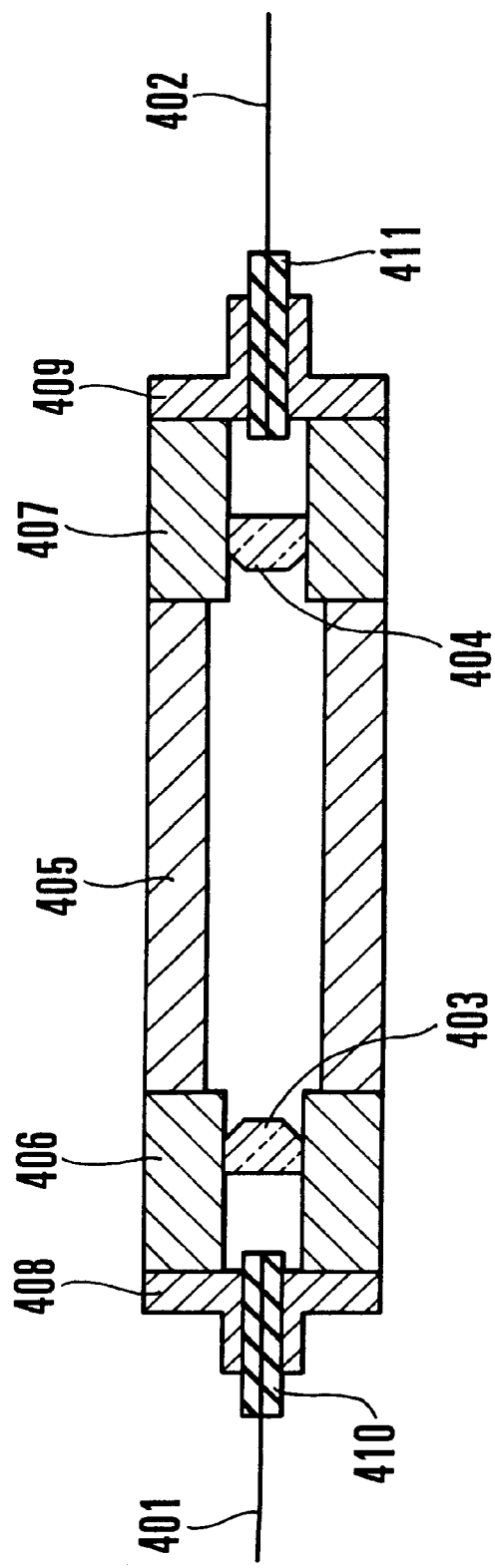
FIG. 5 is a sectional view of a conventional optical coupling module.

FIG. 4 shows an optical coupling module according to the third embodiment of the present invention. In FIG. 4, constituent components that are identical to those of the first embodiment are denoted by the same reference numerals as in the first embodiment.

In the optical coupling module of this embodiment, as shown in FIG. 4, a substrate 320 serving as the third substrate and a substrate 330 serving as the fourth substrate are arranged between substrates 110 and 130. The substrates 110, 320, 330, and 130 are arranged in a row such that their surfaces are flush with each other.

A recess 321 for mounting a lens therein and a recess 322 for mounting an optical filter therein are formed in the surface of the substrate 320. The recesses 321 and 322 are sequentially arranged from the substrate 110 side toward the substrate 330. A lens 103 is fixed in the recess 321, and an optical filter 306 serving as the first optical element is fixed in the recess 322. The optical filter 306 is fabricated by depositing an optical film on a glass plate.

A recess 331 for mounting an optical isolator therein and a recess 332 for mounting a lens therein are formed in the surface of the substrate 330. The recesses 331 and 332 are sequentially arranged from the substrate 330 side toward the substrate 130. An optical isolator 305 serving as the second optical element is fixed in the recess 331, and a lens 104 is fixed in the recess 332.

In the optical coupling module having the above arrangement, the lenses 103 and 104 are fixed on the different, separate substrates 320 and 330, so that their positions relative to each other can be adjusted. When optical elements, e.g., the optical isolator 305 and optical filter 306, are arranged between the lenses 103 and 104, light is refracted while it is transmitted through the optical elements. Accordingly, in order to suppress the excess loss caused by light refraction of the optical elements, the dimensional precision of the optical elements and the precision of positions where the optical elements are fixed must be increased.

With the optical coupling elements (the optical isolator 305 and optical filter 306) of this embodiment, the excess loss caused by light refraction of the optical elements 305 and 306 can be suppressed by adjusting the positions of the lenses 103 and 104 relative to each other. Therefore, the dimensional precision of the optical elements and the precision of positions where the optical elements are fixed need not be increased.

As has been described above, the present invention has the following effects.

According to the present invention, the first and second optical fibers and the two lenses are fixed in the grooves and recess of different, separated substrates, so that the number of portions of the optical coupling module that need adjustment is decreased, and adjustment of the optical coupling module accordingly becomes easy. Since adjustment of the optical coupling module becomes easy, adjustment of the optical coupling module can be automated easily. Furthermore, metal cylinders conventionally used in the conventional optical coupling module, that fix optical fibers and lenses become unnecessary, to make the optical coupling module compact. Since optical axis adjustment is performed by adjusting the positions of the respective substrates in the direction perpendicular to the optical axis, each constituent component does not require a high dimensional precision. As a result, the cost of the optical coupling module can be suppressed.

Since all of the first and second optical fibers and two lenses are fixed on the different, separate substrates, the positions of lenses relative to each other can be adjusted. Hence, even if, e.g., an optical element is arranged between two lenses and light is refracted upon being transmitted through the optical element, an excess loss caused by light refraction of the optical element can be suppressed. Accordingly, the dimensional precision of the optical element and the precision of position where the optical element is fixed need not be increased, and the cost of the optical coupling module can accordingly be suppressed.

What is claimed is:

1. An optical coupling module comprising:
   a first substrate having a surface formed with a first groove;
   a second substrate having a surface formed with a second groove;
   a third substrate arranged between said first and second substrates and having a surface formed with first and second recesses, said first to third substrates having said surfaces flush with each other;
   first and second optical fibers fixed in said first and second grooves, respectively, and arranged such that end faces thereof oppose each other; and
   first and second lenses fixed in said first and second recesses, respectively, and arranged on one optical axis of said first and second optical fibers to be spaced apart from each other by a predetermined distance.

2. A module according to claim 1, further comprising
   an optical element arranged between said first and second lenses, and
   a third recess formed in said surface of said third substrate to fix said optical element therein.

3. A module according to claim 1, wherein said optical element is an optical isolator.

4. A module according to claim 1, wherein said optical element is an optical filter.

5. A module according to claim 1, wherein said third substrate has
   a first divisional substrate having a surface formed with said first recess to fix said first lens therein, and
   a second divisional substrate having a surface formed with said second recess to fix said second lens therein.

6. A module according to claim 5, further comprising
   an optical element arranged between said first and second lenses, and a third recess formed in said surface of said first divisional substrate to fix said first optical element therein.

7. A module according to claim 6, further comprising a second optical element arranged between said first optical element and said and second lenses, and a fourth recess formed in said surface of said second divisional substrate to fix said second optical element therein.

8. A module according to claim 7, wherein one of said first and second optical elements is an optical filter and the other one is an optical isolator.

9. A module according to claim 1, wherein said first and second grooves comprise V-grooves.

10. A module according to claim 1, wherein said first to third substrates have the same substrate thickness and lengths in a direction of an optical axis of said first and second optical fibers, and said first to third substrates are arranged to come into contact with said first and second optical fibers in the direction of the optical axis such that bottom surfaces thereof are flush with each other and side surfaces thereof on one side are flush with each other.

* * * * *